July 15, 1952 — L. H. JACKSON — 2,603,552
APPARATUS FOR TREATING COTTONSEED AND
THE LIKE FOR PLANTING PURPOSES
Filed July 26, 1949 — 2 SHEETS—SHEET 1
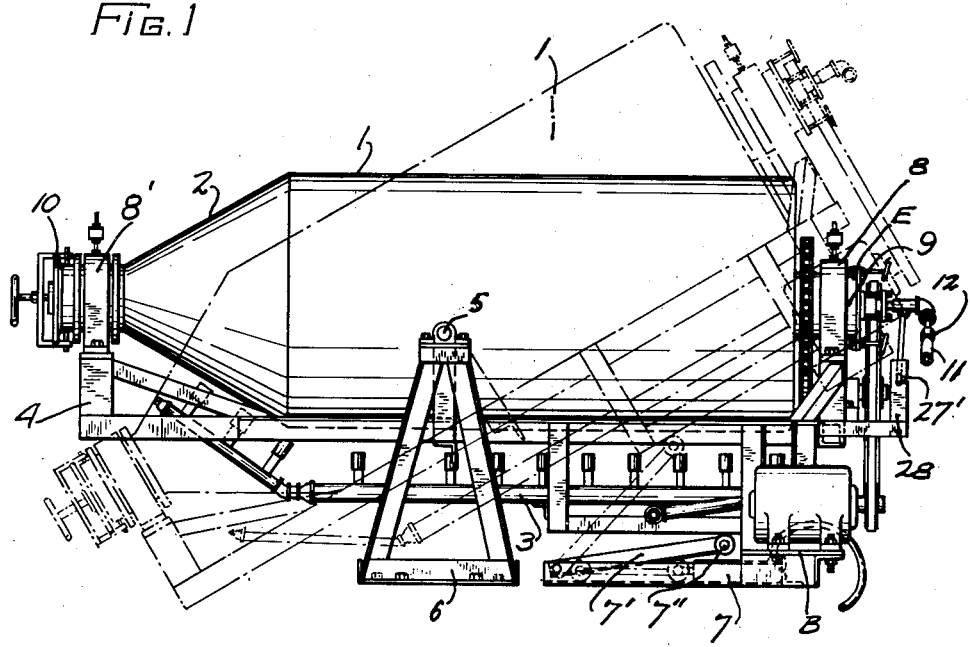
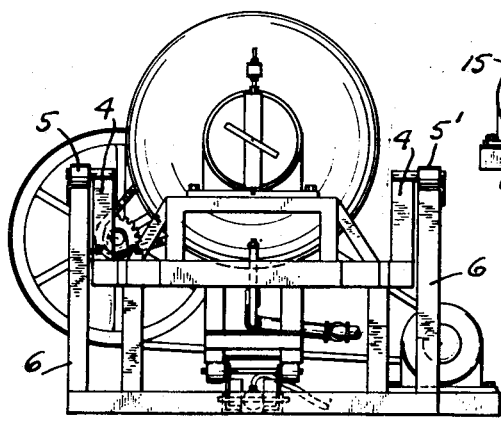
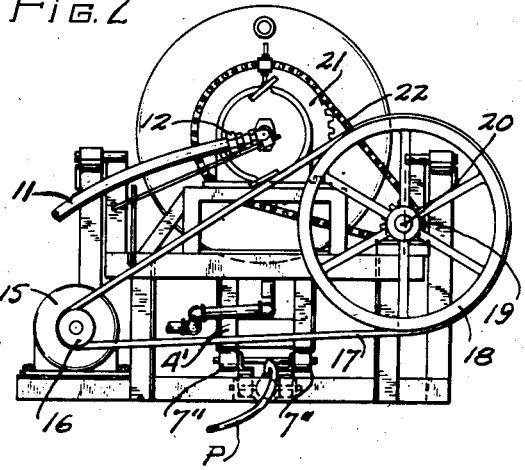
INVENTOR.
Lloyd H. Jackson
BY Andrew T. Dupont
his Attorney July 15, 1952
L. H. JACKSON
2,603,552
APPARATUS FOR TREATING COTTONSEED AND
THE LIKE FOR PLANTING PURPOSES
Filed July 26, 1949
2 SHEETS—SHEET 2
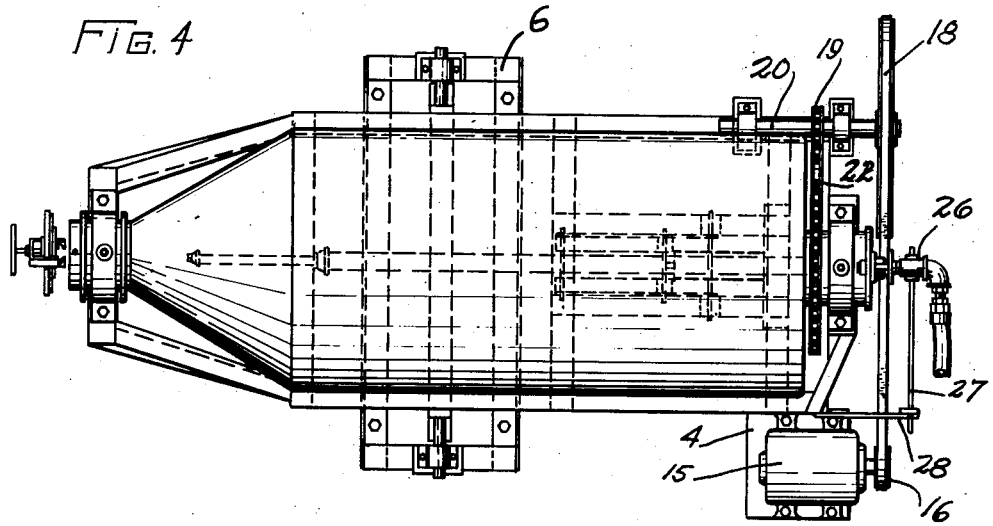
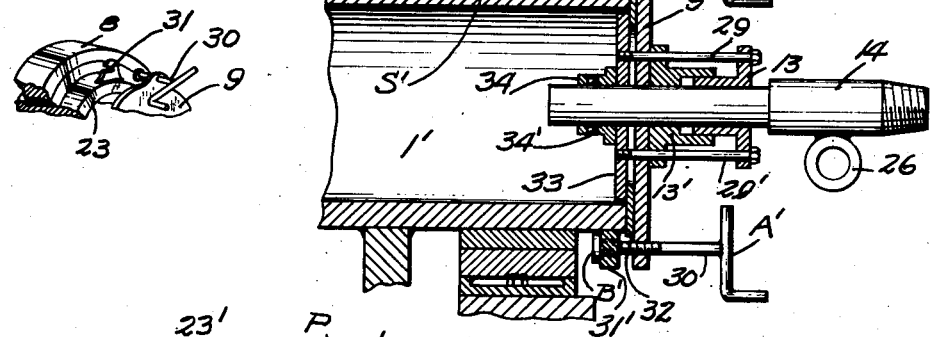
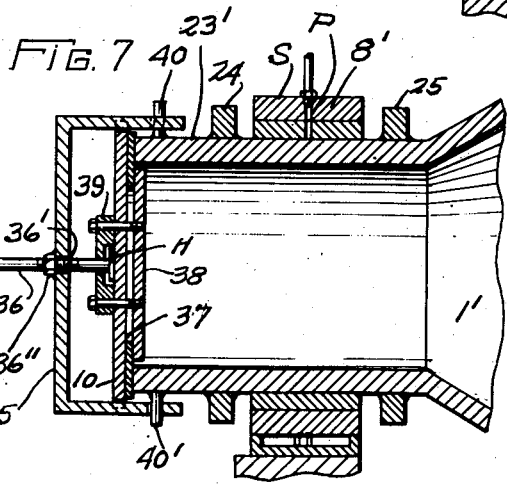
INVENTOR.
Lloyd H. Jackson
BY Andrew T. Dupont
his Attorney Patented July 15, 1952

2,603,552

UNITED STATES PATENT OFFICE 2,603,552

APPARATUS FOR TREATING COTTONSEED AND THE LIKE FOR PLANTING PURPOSES

Lloyd H. Jackson, Vernon, Tex.

Application July 26, 1949, Serial No. 106,944

4 Claims. (Cl. 21—93)

My invention relates to an improved machine for delinting and sterilizing cottonseed and the like prior to the planting thereof.

The delinting of cottonseed prior to planting by the use of dry hydrochloric acid in gas form and the application of heat, is practised for the purpose of improving germination, increasing yield, shortening the germination period and the time required for maturity and necessitating the use of only one half the usual amount of seed per acre. The purpose of this process is to destroy or remove seed-borne bacteria and fungi of plant-borne diseases, the seed-borne spores of mold causing seeds to decay, to control the seed-borne fungi causing cotton seedlings to damp off and resulting in the loss of squares and bolls later in the season from anthracnose, angular leaf spot, boll rot, bacterial blight or other seed-borne diseases of cotton. A further purpose of the gas and heat treatment is to destroy or control seed-borne insect pests, their eggs, larvae and pupae, by applying such gas and heat under pressure while the seeds are agitated in a closed chamber or container.

The devices of the prior art, however, while carrying on the above process, have proven ineffective to a high degree due to the injury received by good seeds in the machines used for the purpose as well as to the difficulties encountered in the mechanical operation of the apparatus.

One object of my invention is to provide a device which will avoid one or more of the disadvantages of the prior art.

Another object of my invention is the provision of an apparatus which is easily controllable, adequate in its operation; which will avoid overheating and excessive gas treatment of the seeds and which will improve the quality and germination of the seeds under treatment therein.

Further objects of my invention will become evident as the features of construction and the arrangement of the parts are developed in this specification and as they are specifically illustrated in the accompanying drawings in which:

Figure 1 is a side elevation of the apparatus, also illustrating a tilted position thereof;

Figure 2 is a right-hand view of Figure 1;

Figure 3 is a left-hand view of Figure 1;

Figure 4 is a plan view of Figure 1;

Figure 5 is a partial sectional view of the right-hand side of the apparatus;

Figure 6 is a fragmentary illustration of the means employed for securing some of the parts; and Figure 7 is a partial sectional view of the left-hand side of the apparatus.

In these drawings, numeral 1 represents a cylindrical drum having a cone-shaped extension 2 at the left end thereof. The drum and its extension form a chamber 1' heated exteriorly with a suitable gas such as natural gas or butane by means of a burner 13. The drum 1 is mounted in a tilting frame 4 carried on trunnions 5, 5', secured in a stationary frame 6. This arrangement permits the frame 4 to tilt about the trunnions 5, 5' to an angle of 30° in order to empty the contents of the drum 1.

The tilting of the drum is accomplished by means of a hydraulic lift generally indicated at 7 and consisting of a cylinder and plunger, the plunger rod 7' of which is provided at its outward end with rollers 7'' contacting extension members 4' depending vertically from the frame 4 as shown in Figure 2. Thus, when pressure fluid is fed to the cylinder of the hydraulic lift through pipe P, the plunger rod 7' is forced outwardly, the rollers 7'' push upwardly against the members 4' forcing the frame 4 to pivot about the trunnions 5, 5' to tilt the frame and the drum 1 to the desired angle of 30°. Admission and exhaust of the pressure fluid to and from the hydraulic lift are controlled by means of the commonly known three-way valve.

The drum 1 and its conical extension 2 are supported in bearings 8, 8' respectively. The drum is loaded with the seeds to be treated at its right-hand end by means of an auger-type loading machine, preferably, though it can be loaded by hand. The right-hand end of the drum 1 has a closure 9 and the left-hand end has its own closure 10. Both closures are of the snap-on type and they consist of, for the left-hand end or discharge end, the plate 10, yoke 35, handwheel and screw 36, retaining collar 39, gasket 38 and retaining plate 37. The screw 36' works in a nut 36'' welded to the yoke 35 and is constrained from moving longitudinally due to the head H thereon enclosed within a hollow space in collar 39. The right-hand or loading end of the drum 1 consists of the plate 9 adapted to be tightened against the end of the drum by means of bolts 30, 30' having handles A, A' integral therewith at one end thereof and heads B, B' at the opposite end. These bolts hook over lugs 31, 31' welded to the drum 1 and enable the plate 9 to be tightened against the drum. A gasket 32 of hard rubber is located between the plate 9 and the open end of the drum 1 to insure air tightness. Plate 33 holds gasket 32 in proper position. A collar 34 is secured at the end of gas pipe 14 extending within chamber 1' by means of a set screw 34'. Normally, the so-called snap-on head is picked up by hand, placed against the right-hand end of the machined end of the drum 1, rotated slightly so that the bolts 30, 30' catch on the lugs 31, 31' and are tightened down to the desired tightness. To remove this snap-on head, the bolts 30, 30' are loosened, the head rotated slightly and lifted away from the apparatus.

Reverting to the bearings 8, 8', it will be noted that they consist of an outer shell S, containing a babbitt or other suitable soft bearing metal S', resting directly upon the shell of drum 1, there being provided sight-feed oilers feeding oil to the bearing passages P.

The drum or shell 1 is rotated at a speed of about 30 R. P. M. by means of a motor having its base B secured to the tiltable frame 4 so that it will tilt with the said frame. The shaft of the motor is provided with a sheave 16 on which a driving belt 17 is driven, this belt also driving a pulley 18 mounted on a shaft 20. This shaft 20 carries a sprocket wheel 19, provided with a roller chain sprocket 22 driving another sprocket wheel 21, the hub of which is machined out and welded to a hub extension E on the right-hand end of the drum 1. This arrangement allows for a positive drive without the usual shaft extending through the drum and possesses the added advantage of allowing for the unimpeded loading and unloading of the apparatus through a relatively small opening in the exact center of the machine. The bearings 8, 8' located respectively at the loading end and the dumping end of the machine, carry the weight of the drum 1 and associated parts allowing for the function described.

Normally, the seeds are fed to the chamber 1' after the right-hand end snap-on head has been removed and while the drum 1 is in horizontal position. The head is then put in place and the drum is rotated through the motor 15 and its associated driving parts for a period of from 7 to 15 minutes and the pressure within the drum is kept from slightly atmospheric to two atmospheres. During this time hydrogen chloride gas is supplied to chamber 1' through gas hose and connections 11, 12 and 14. At the same time the shell 1 is heated by means of the heater 3, which is secured to the tilting frame 4, at a temperature varying from 120° to 140° F. At the end of the desired period of rotation, the left-hand end snap-on head is removed, the hydraulic lift 7 is energized to raise the drum 1 to a tilt of about 30° together with its frame 4. It will be noted that during this tilting movement the driving motor 15 and the gas heater or burner 3 tilt with the frame 4, which revolves about the trunnions 5, 5'. In this position, the treated seeds are dumped from the drum 1 while the latter continues to rotate.

The construction and operation of the apparatus of this invention will be clearly understood from the foregoing description.

In closing, it is pointed out that the gland structure of the right-hand end snap-on head comprises a packing gland 13' secured to the head 9 by means of the bolts 29, 29'. The movable part of the packing gland 13 moves inwardly by tightening these bolts thus, at the same time, forcing packing material around the gas pipe 14.

Ring 26, shown below pipe 14 in Figure 5, serves to hold pipe 14 in stationary position through extraneous means while cylinder 1 rotates. This may be accomplished by placing a rod 27 through the ring and then placing the opposite end of the rod 27 in a slot 27' provided in a suitable bracket 28 secured to the tilting frame 4.

It will be appreciated that the conical shape of the portion 2 of drum 1 assists greatly in emptying the contents of the said drum when tilted at the end of the treatment of the seeds.

Having thus described my invention, what I claim is:

1. An apparatus for delinting and sterilizing cotton seeds, comprising a stationary frame having a base and spaced-apart extensions protruding upwardly from the base, a second frame within the stationary frame having a base and a pair of arms extending upwardly from said last mentioned base between the aforesaid extensions, pivot means between the extensions and the arms whereby the second frame may swing within the stationary frame, a pair of bearings carried by the base of the second frame at each end thereof, an open-ended hollow shell adapted to receive seeds for treatment, means for admitting a gas within the shell, means for rotatably mounting the ends of the shell within the aforesaid bearings, removable closures for the open ends of the shell, means for rotating the shell within the bearings during treatment of the seeds, said means being mounted on the second frame, and means for tilting said second frame and the shell about the pivot means, to remove the seeds by gravity from the shell when the closure at the lowermost end of the shell is removed.

2. An apparatus as set forth in claim 1, including a heater beneath said shell and mounted on the tilting frame and the means for introducing a gas within the shell extending through one of said closures.

3. An apparatus as set forth in claim 1, wherein the means for rotating the shell comprise a motor mounted on the second frame, and driving connections between said motor and the shell.

4. An apparatus as set forth in claim 1, wherein the means for tilting the frame comprise a stationary motor and a movable element operated thereby and contacting the second frame.

LLOYD H. JACKSON.

REFERENCES CITED

The following references are of record in the file of this patent:

UNITED STATES PATENTS

| Number | Name | Date |
| --- | --- | --- |
| 249,978 | Palmer | Nov. 22, 1881 |
| 678,411 | Lessing | July 16, 1901 |
| 1,073,945 | Warner | Sept. 23, 1913 |
| 1,123,877 | Hill | Jan. 5, 1915 |
| 1,602,576 | Gant | Oct. 12, 1926 |
| 1,633,301 | Williams | June 21, 1927 |
| 2,112,159 | Jackson | Mar. 22, 1938 |
| 2,447,606 | Wine | Aug. 24, 1948 |